United States Patent [19]

Whetstone et al.

[11] Patent Number: 4,550,316
[45] Date of Patent: Oct. 29, 1985

[54] STYLUS MOUSE

[75] Inventors: Albert L. Whetstone, Stratford; Kerry L. Shaklee, Fairfield, both of Conn.

[73] Assignee: Display Interface Corp., Milford, Conn.

[21] Appl. No.: 489,828

[22] Filed: Apr. 29, 1983

[51] Int. Cl.⁴ .............................................. G09G 1/00
[52] U.S. Cl. .................................. 340/710; 340/706; 340/709; 178/18; 250/231 R
[58] Field of Search ............... 340/710, 709, 706, 707; 178/18, 20; 250/231 R, 231 SE

[56] References Cited

U.S. PATENT DOCUMENTS

| | | | |
|---|---|---|---|
| 3,304,434 | 2/1967 | Koster | 250/231 |
| 3,346,853 | 10/1967 | Koster et al. | |
| 3,462,548 | 8/1969 | Rinder | 178/18 |
| 3,528,295 | 9/1970 | Johnson et al. | |
| 3,541,521 | 11/1970 | Koster | |
| 3,541,541 | 11/1970 | Engelbart | |
| 3,566,392 | 2/1971 | Jones et al. | |
| 3,835,464 | 9/1974 | Rider | |
| 3,892,963 | 7/1975 | Hawley et al. | 250/231 |
| 3,911,419 | 10/1975 | Bates et al. | 340/709 |
| 4,091,234 | 5/1978 | Bristow | 178/18 |
| 4,103,331 | 7/1978 | Thacker | 340/710 |
| 4,303,914 | 12/1981 | Page | 340/706 |
| 4,318,096 | 3/1982 | Thornburg et al. | 340/710 |
| 4,354,102 | 10/1982 | Burns et al. | 250/201 |
| 4,364,035 | 12/1982 | Kirsch | 340/710 |
| 4,369,439 | 1/1983 | Broos | 340/710 |
| 4,390,873 | 6/1983 | Kirsch | 340/710 |
| 4,409,479 | 10/1983 | Sprague et al. | 340/710 |
| 4,506,336 | 3/1985 | Hird | 340/710 |

Primary Examiner—Gerald L. Brigance
Attorney, Agent, or Firm—Cifelli, Frederick & Tully

[57] ABSTRACT

A mouse comprises a housing for sliding movement on a nonspecific work surface, and a stylus depending from the housing and contacting the work surface. The stylus bends and vibrates during movement, and the direction and distance of movement are derived from such bending and vibration. Strain gauges, mounted directly to the stylus or to a diaphragm mounting the stylus, are used to ascertain bending and vibration. Photocell means are also disclosed to ascertain bending a vibration of the stylus.

25 Claims, 12 Drawing Figures

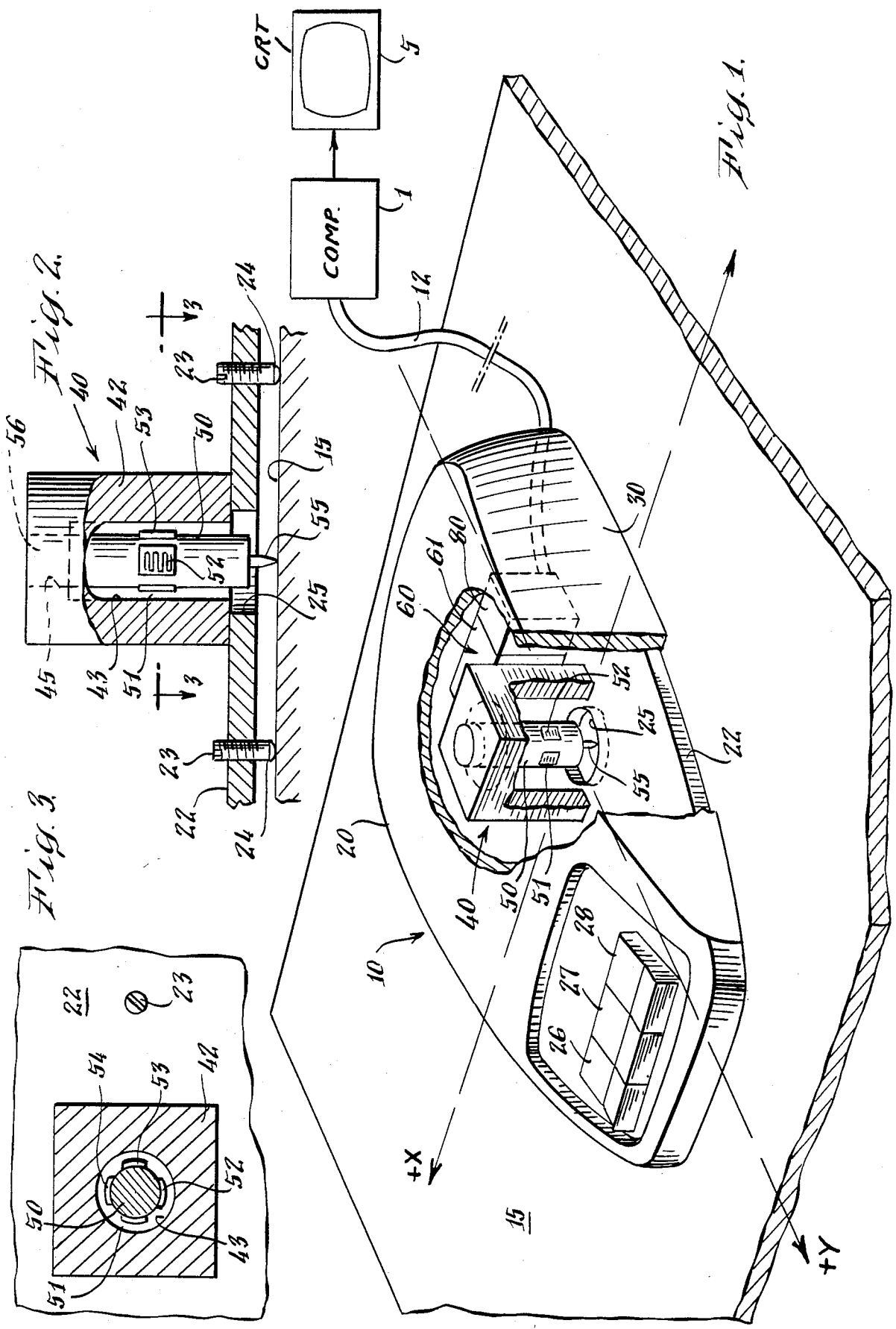

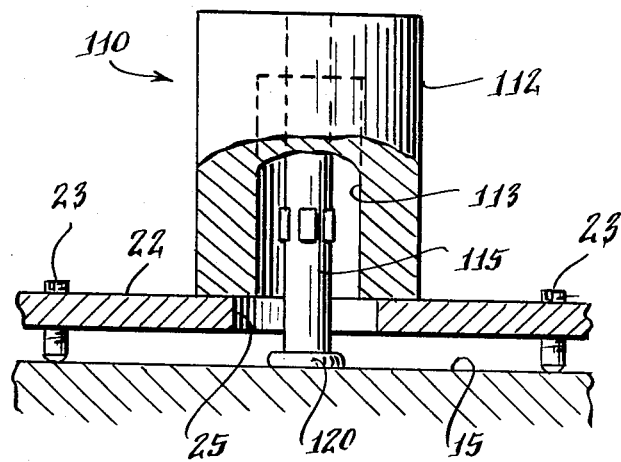
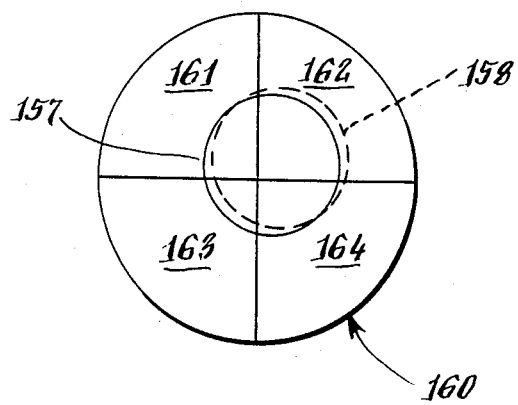
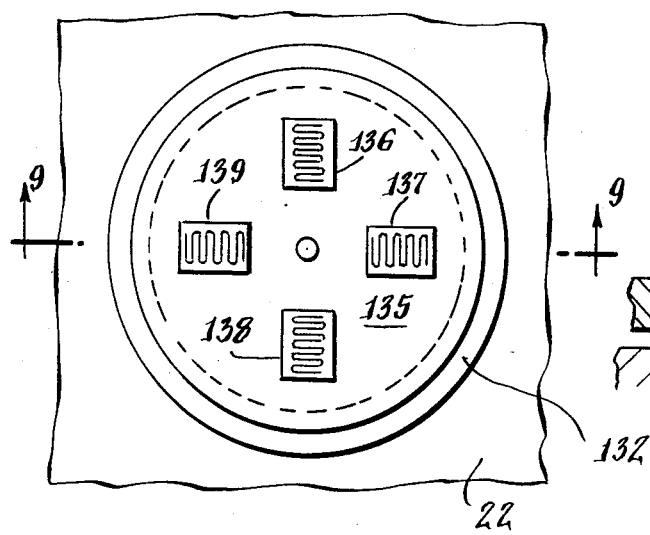
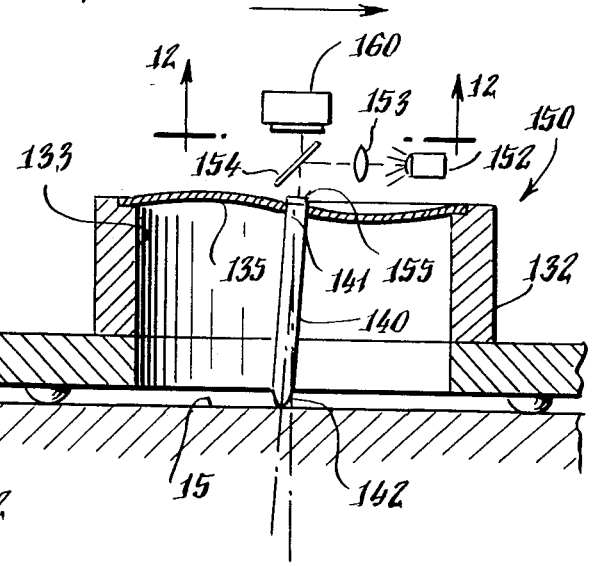
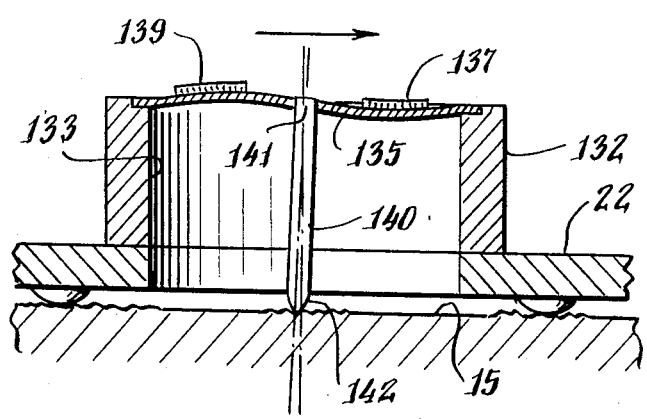

STYLUS MOUSE

BACKGROUND OF INVENTION

The invention herein relates to a cursor controller, or mouse which generates cursor control signals based upon interaction of a stylus with a work surface as the mouse is moved thereon.

There are two basic types of mice available heretofor, namely mechanical and optical mice. The first type of mechanical mouse is comprised generally of a housing supported for rolling motion by two wheels, the wheels being oriented perpendicular with respect to each other for rolling motion in perpendicular axes. Thus, when the mouse is moved on a work surface, the slipping and rolling of each wheel corresponds to direction and distance motion in one axis. The rotation of the wheels is translated into signals used to produce corresponding movement of a cursor on a cathode ray tube display. Engelbart U.S. Pat. No. 3,451,541 and Hawley U.S. Pat. No. 3,892,963 disclose examples of two-wheel mechanical mice.

In a second type of mechanical mouse, the housing mounts a sphere which rolls on the work surface, and the housing further mounts wheels which are driven by the sphere, the wheels having transducers associated therewith for providing signals indicative of motion of the mouse in two axes. A mouse of the spherical ball type is disclosed in Rider U.S. Pat. No. 3,835,464. The spherical ball mouse eliminates some of the problem of dragging one wheel sideways when motion is not in the plane of that wheel, but slippage of the wheels and of the sphere with respect to the work surface remain a problem. Reliability has been limited by a susceptibility to dirt from the surface. Mechanical mice have generally been expensive and difficult to manufacture in that they require high precision parts.

The optical mouse is comprised of a housing including a light source and light sensors, used in combination with a specially patterned work surface. As the mouse is moved across the work surface, its light sensors can detect the direction and extent of movement through pattern recognition, and provide signals for controlling corresponding movement of a cursor on a cathode ray tube. An optical mouse is described in Kirsch U.S. Pat. No. 4,364,035. The disadvantage of the optical mouse is the requirement of a special patterned pad, the necessity of the pad rather than the mouse itself setting the axes of movement and the inconvenience of having to clear the pad of other work material when the mouse is in use.

A third type of mouse, which has not gained commercial acceptance, is disclosed in Page U.S. Pat. No. 4,303,914. This mouse comprises a housing mounting two conventional piezo electric audio pick-ups, with the audio pick-ups oriented at right angles to each other. When the styli of the audio pick-ups are drawn across a microscopically textured surface, such as a sheet of paper, each audio pick-up produces a succession of uni-directional pulses with the polarity of the pulses being indicative of the direction of motion along a selected axis. The extent of motion is determined by a count of pulses, the pulse information being used to control movement of a cursor dot on a cathode ray tube.

SUMMARY OF INVENTION

A cursor controller, or mouse, according to the invention herein generally comprises a housing adapted for sliding movement on a nonspecific work surface, and a stylus mounted in the housing and depending therefrom to contact the work surface. The stylus is preferably positioned generally vertical with respect to the surface, and upon movement of the housing across the surface, the stylus mechanically interacts with the surface and bends in a direction opposite to the direction of motion. The stylus also vibrates from interaction with the surface. The mouse further generally comprises means for ascertaining the direction of bending of the stylus and the vibration of the stylus, this information being used to provide signals controlling the motion of a cursor dot on a cathode ray tube, with motion of the cursor dot corresponding to the motion of the mouse.

The work surface is nonspecific in that no particular work surface is required. Paper blotters, or any surface which frictionally and mechanically interacts with the stylus suffices. The stylus may have a pointed tip in contact with the work surface, or may have an enlarged tip in the form of a ball or pad for greater contact with the work surface.

In one embodiment, the upper end of the stylus is fixedly mounted in the housing and the stylus is sufficiently flexible to bend as the mouse is moved across the work surface. A plurality of strain gauges, preferably four, are deployed about the circumference of the stylus, and the strain gauges are connected into an electrical circuit which detects the bending of the stylus, from which the direction of mouse motion can be derived. The strain gauges are also used to detect vibration of the stylus, from which the distance of mouse movement can be derived.

In another embodiment, the stylus is mounted to a flexible diaphragm within the housing, wherein bending of the stylus in the sense of displacing it from its rest position flexes the diaphragm. Detection of bending and vibration of the stylus are achieved either by attaching strain gauges to the diaphragm or by using optical means employing reflection from the diaphragm or a reflecting surface attached thereto.

The invention also resides in the method of controlling a cursor dot on a cathode ray tube display, including deploying a stylus normal to a work surface and in contact therewith, moving the stylus on the work surface in the direction of desired motion of the cursor dot, thereby causing vibration of the stylus through mechanical interaction with the work surface and bending of the stylus opposite the direction of motion, ascertaining the direction of bending of the stylus and providing signals for moving the cursor dot opposite to the direction of bending, and measuring the vibration of the stylus over successive intervals of time and moving the cursor dot in the calculated direction a distance which is a function of the vibration of the stylus.

The invention employs a mouse using a single stylus in interaction with a work surface, adapted so that the response of the stylus is omni-directional. The mouse is compatible with most surfaces available at computer terminals, e.g. paper, and requires no special work pad. Accuracy is good, cost is reasonable and dependability is very high.

Accordingly, it is a principal object of the invention herein to provide an improved cursor controller or mouse.

It is an another object of the invention herein to provide a mouse which provides excellent control in all directions of motion.

It is a further object of the invention herein to provide a mouse which operates on a passive, nonspecific work surface.

It is an additional object of the invention herein to provide a mouse which is easy to use.

It is yet another object of the invention herein to provide a mouse which is highly reliable, and in particular is not subject to failure because of dirt or dust, and is inexpensive to manufacture.

These and other objects and features of the invention herein will in part be obvious and will in part appear from a perusal of the following description of the preferred embodiments and the claims, taken together with the drawings.

DRAWINGS

FIG. 1 is a perspective view of a mouse according to the invention herein, partially cut away, and shown on a work surface;

FIG. 2 is a side elevation cutaway view of the stylus assembly of the mouse of FIG. 1;

FIG. 3 is a sectional view of the stylus assembly of the mouse of FIG. 1, taken along the lines 3—3 of FIG. 2;

FIG. 8 is a side elevation view of an alternative stylus assembly for the mouse of FIG. 1;

FIG. 9 is a side elevation, sectional view of another stylus assembly for the mouse of FIG. 1, taken along the lines 9—9 of FIG. 10;

FIG. 10 is a top plan view of the stylus assembly of FIG. 9;

FIG. 11 is a side elevation, sectional view of yet another stylus assembly for the mouse of FIG. 1; and FIG. 12 is an enlarged sectional view of the stylus assembly of FIG. 11, taken along the lines 12—12 of FIG. 11.

The same reference numerals refer to the same elements throughout the various figures.

DESCRIPTION OF PREFERRED EMBODIMENTS

Figure 4:
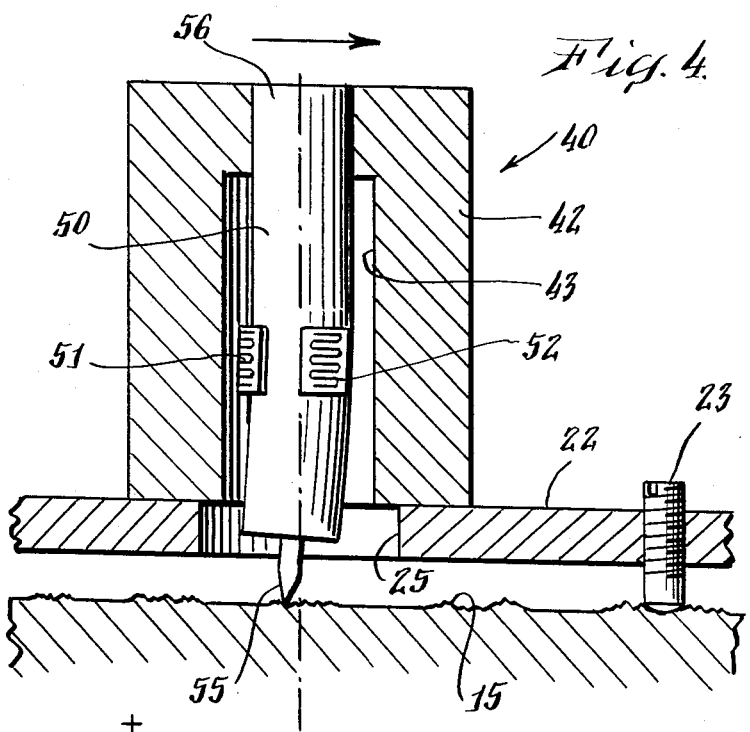
FIG. 4 is enlarged side elevation view of the stylus assembly of the mouse of FIG. 1, showing bending of the stylus.

The invention herein relates to a cursor controller, or mouse, for controlling movement of a cursor dot on a cathode ray tube display, typically providing user interaction with computer software. The mouse is characterized in that information relating to the movement of the mouse on a work surface is derived from interaction of a stylus with the work surface. The direction of movement of the mouse is ascertained from the bending, or deflection, of the stylus, and the distance of movement of the mouse is derived from vibration of the stylus.

The mouse according to the invention generally comprises a housing adapted for supported sliding movement over a nonspecific work surface and a stylus depending from the housing, generally perpendicular to the plane of the work surface when no pressure load is exerted thereon. A tip of the stylus is in contact witn the work surface, and when the mouse is moved across the work surface, the stylus bends in a direction opposite to the direction of travel. The stylus also vibrates from mechanical or frictional interaction with the work surface. The term "bend" is used in the specification is to be construed broadly to include bending of the stylus itself or deflection of the stylus transmitted to the stylus mounting. The mouse further generally comprises means for sensing the bending and vibration of the stylus and for providing signals based thereon which correlate to the direction and distance of mouse travel, for corresponding cursor dot control.

A mouse 10 according to the invention herein is illustrated in FIGS. 1-4. The mouse 10 is shown on a work surface 15, and is connected to a computer 1 via a cord 12. The computer 1 has a cathode ray tube display 5 associated therewith, which displays a cursor dot or the like, the movement of which is controlled by the mouse. The mouse 10 generally comprises a housing 20 mounting a stylus assembly 40 including a stylus 50, and electronic means 60 for generating control signals to the computer 1.

The housing 20 comprises a bottom plate 22 and a cover 30. The housing 20 preferably has an elongated shape with three buttons 26, 27 and 28 mounted to or through the cover at one end thereof. The three buttons provide for operator control of various software dependent functions, as is well known in mechanical and optical mice, and their positioning on the housing together with the elongated shape of the housing establishes a first or y-axis of the mouse, the buttons being deployed in the positive y-direction. The second or x-axis of the mouse 10 is perpendicular thereto, and both axes are illustrated in FIG. 1. As will be discussed more fully below, movement of the mouse housing 20 in its positive y-direction will cause a corresponding movement of the cursor dot on the CRT display 5 in the positive y-axis thereon, while lateral movement of the mouse housing 20 in its x-axis produces motion of the cursor dot in the x axis. The mouse housing can be moved diagonally and will produce corresponding diagonal movement of the cursor dot on the CRT display 5.

It should be noted that the coordinate system of the mouse 10 is determined by the mouse housing 20 rather than by the work surface, and that the work surface is a passive nonspecific work surface which merely cooperates with the stylus assembly to produce bending and vibration of the stylus during movement of the mouse housing.

The bottom plate 22 is supported on posts 23, best seen in FIGS. 2 and 4, the posts having rounded tips of 24 for sliding movement on the work surface 15. The posts 23 may be threaded into the plate 22 for height adjustment, which is sometimes required for initial adjustment or for adjustment to compensate for stylus wear or even for use on unusual work surfaces.

The bottom plate 22 also mounts the stylus assembly 40, which includes a stylus 50 extending downwardly through an opening 25 in the bottom plate. In the embodiment of FIGS. 1-4, the stylus assembly 40 includes a rigid stylus mounting block 42, comprised of a block of rigid plastic or other material secured to the bottom plate 22 surrounding opening 25, and having a central opening 43 for accommodating the stylus 50. The stylus 50 is comprised of a semi-rigid cylindrical plastic post having its upper end 56 received and secured in an opening 45 in the mounting block 41, and having a tip 55 at its lower end in contact with the work surface 15. By "semi-rigid," it is meant that the stylus 50 is sufficiently rigid to vibrate as the mouse is moved across the work surface 15, but sufficiently yielding to bend slightly during mouse motion, as illustrated in FIG. 4. In other words, the stylus has spring-like properties in its ability to bend and vibrate.

Secured to the external surface of the cylindrical stylus 50, approximately midway its length and in an axial portion thereof which experiences bending upon movement of the mouse across the work surface, are four strain gauges 51-54. The strain gauges are deployed at evenly-spaced intervals about the stylus 50, as best seen in FIG. 3. The strain gauges are resistance devices, the resistance of which changes according to whether the devices are elongated or compressed. With reference to FIG. 4, as the mouse is moved across the work surface 15, the tip 55 of the stylus 50 engages the work surface, and the stylus bends opposite the direction of motion (the direction of motion is to the right in FIG. 4). Thus, strain gauge 51 in FIG. 4 is compressed, along with strain gauge 54 not visible but on the back side of the stylus. Strain gauges 52 and 53 are somewhat elongated by the bending motion. As also illustrated in FIG. 4, the work surface 15 is generally very finely textured, e.g. paper, and sets up a mechanical/frictional interaction with the stylus tip, such that the stylus vibrates. This vibration is about the bent position, and the vibration causes high frequency elongation and compression of the strain gauges.

Figure 5:
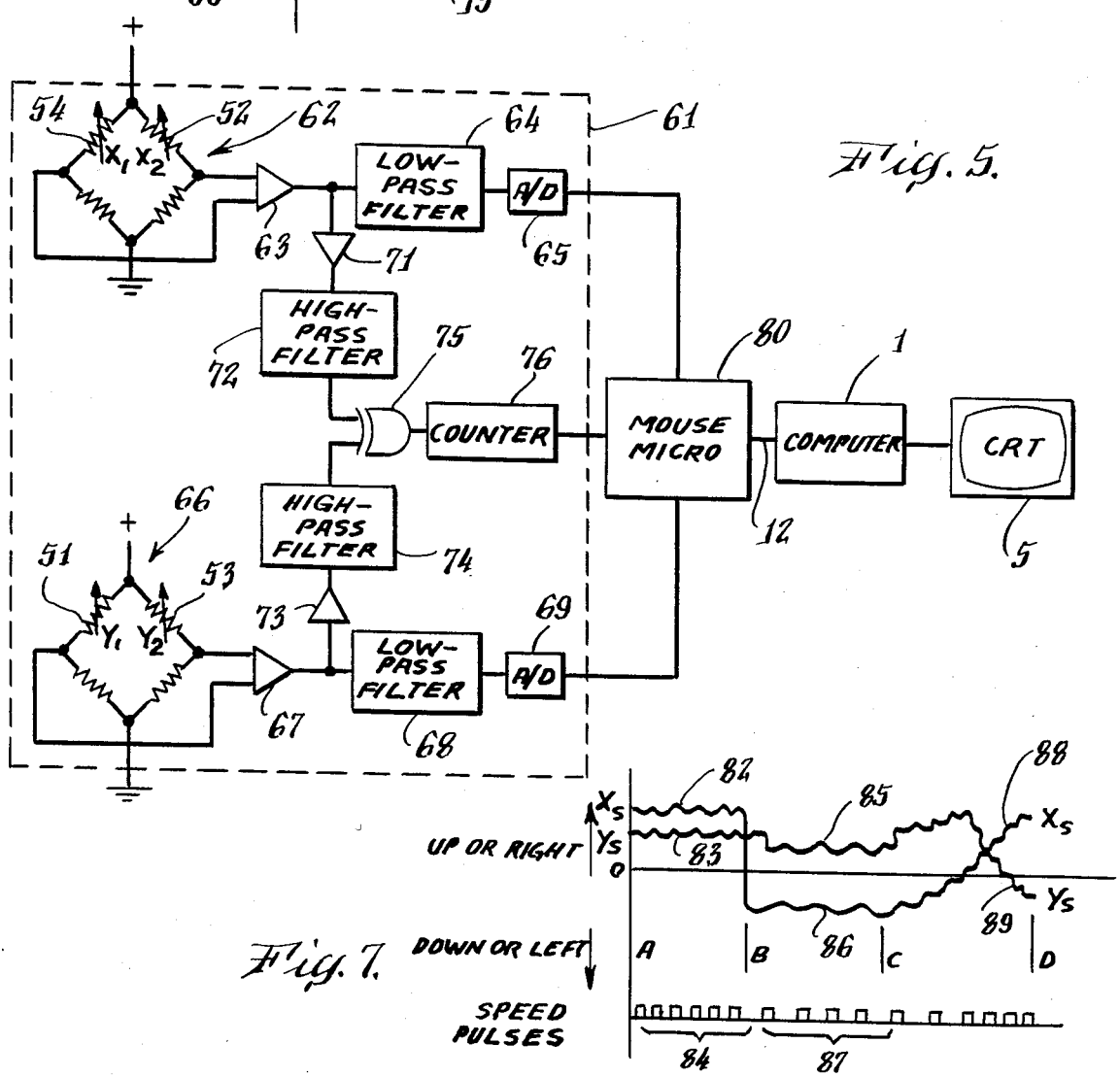
FIG. 5 is a circuit diagram for the mouse of FIG. 1.

With reference to FIGS. 1 and 5, the mouse 10 further comprises electronics 60, incorporating the strain gauges, for generating control signals based on mouse motion. The electronics 60 is divided generally into strain gauge circuitry 61, surrounded by a dotted block in FIG. 5, and a microprocessor 80. With reference to FIG. 5, the strain gauges 52 and 54, and also designated $X_1$ and $X_2$ because they are deployed on the x-axis of the mouse 10, are connected in an x-axis resistance bridge 62, the bridge being connected to an amplifier 63. The amplified bridge signal is filtered by a low pass filter 64 to provide a DC component, which is converted to a digital value via analog-to-digital converter 65, with that value being provided to the mouse microprocessor 80. It will be appreciated that the filtered signal eminating from the low pass filter 64, and the digital conversion thereof, are a measure of the degree of x-axis bending of the stylus 50 and can also be considered as the x-axis component of a direction vector opposite the direction of mouse motion. The y-axis strain gauges 51 and 53 are connected into a y-axis bridge 66, the bridge being connected to amplifier 67, low pass filter 68 and an analog to digital converter 69, which provide the microprocessor 80 with the x-axis component of stylus bending. The microprocessor is suitably programmed to derive the direction of mouse motion from the x-axis and y-axis components, based on trigonometric principles.

To ascertain the distance of mouse motion, the amplified output of the x-axis bridge 62 is further amplified, as required, by an amplifier 71, and is filtered by a high pass filter 72, thereby enhancing and isolating the variation in the bridge signal due to vibration of the stylus 50. The output of the y-axis bridge 66 is similarly passed through amplifier 73 and high pass filter 74. The outputs of the two high pass filters 72 and 74 are directed to an exclusive OR gate 75, the output of which is a series of pulses which are, to sufficient accuracy, proportional to the distance of movement of the mouse across the work surface. The truth table of the exclusive OR gate is such that the contributions from the x-axis and y-axis bridges are combined to produce total pulses which are accurate to the needs of the device. The pulses are provided to a counter 76, and the output of the counter is read on a regular basis by the mouse microprocessor 80. The number of pulses occurring in a given sampling time is indicative of the distance of motion for that time period.

It has been found that the pulses are also useful information in calculating direction of movement. More particularly, a preferred algorithm for calculating direction of motion is as follows:

$$\Delta X = p \cos \left[ \arctan \left( \frac{y_s'}{x_2'} \right) \right] ;$$

$$\Delta Y = p \sin \left[ \arctan \left( \frac{y_s'}{x_2'} \right) \right] ,$$

where p1 p=number of pulses in a sampling time interval and $0 \leq p \leq 2^{15}$;

$x_s$, $y_s$=conditioned strain gauge bridge output and $-128 \leq X_s, Y_s \leq +127$; and $$x_s' = \frac{X_s}{128}, Y_s' = \frac{Y_s}{128}, \text{ whereby } -1 \leq X_2', Y_s' \leq 1.$$

It will be appreciated that some of the limits in the foregoing are hardware constraints, and that the microprocessor 80 is programmed to perform the algorithm.

The mouse microprocessor 80 provides signals indicative of mouse motion including the direction of motion and distance of motion to the computer 5 over a mouse tail 12, the mouse tail comprising a flexible cord connector, and the computer 1 utilizes the information in providing display and motion of the cursor dot on the cathode ray tube 5.

The circuitry 61 and the mouse microprocessor 80 are mounted within the mouse housing 20, and the microprocessor 80 may also service the buttons 26-28. Although shown in schematic block format in FIG. 1, the electronics package can occupy additional available volume as required within the mouse housing 20.

Figure 6:
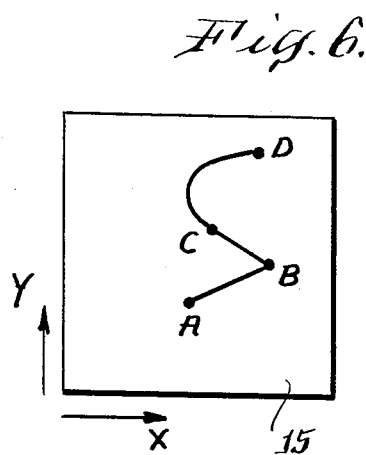
FIG. 6 is a schematic representation of mouse movement on a work surface.
Figure 7:
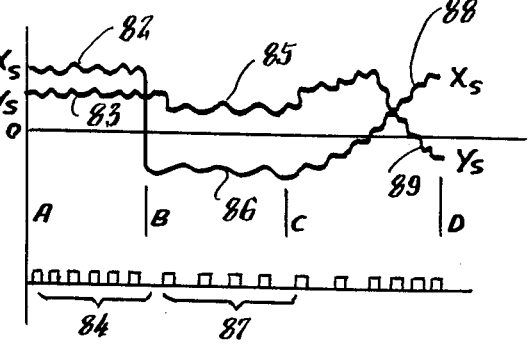
FIG. 7 is a graph illustrating the operation of the mouse of FIG. 1, and particularly the circuitry of FIG. 5.

With reference to FIG. 6 and 7, the operation of the mouse and the circuit of FIG. 5 is illustrated by a diagram and a graph, respectively. The diagram of FIG. 6 consists of a plan representation of the work surface 15, and a path of mouse movement thereon sequentially from points A to points D. The graph of FIG. 7 has an upper portion showing the outputs of the x-axis and y-axis strain gauge bridges 62 and 66 and a lower portion illustrating the operation of the exclusive OR gate 75. Turning first to the mouse motion diagram, it assumes that the mouse housing is held with its y-axis vertical and the x-axis horizontal, for purposes of illustration. Thus, mouse motion from point A to point B is positive in both the x-axis and y-axis, with larger x component than y component. This is illustrated in the graph of FIG. 7 where the $X_s$ or x-strain gauge bridge output at 82 is higher than $Y_s$, the y-strain gauge bridge output at 83. The fluctuation about the mean value of the signal is isolated by the high pass filters and provided to the exclusive OR gate, which provides pulses indicated at 84 on the lower portion of the graph of FIG. 7. A fairly large number of pulses in a given time period indicates fairly high speed, and hence distance from A to B. At point B in the FIG. 6 diagram, the mouse motion in the x-axis reverses, while continuing upwardly in the y-axis. This is illustrated in the upper graph of FIG. 7 by a slight decrease in the value of the $Y_s$ signal at 85 and the $X_s$ signal going negative at 86. The vibration component of the $X_s$ and $Y_s$ signals is also decreased, resulting in a fewer number of pulses at 87, indicating a smaller distance of movement. This follows from the mouse motion diagram, wherein the distance from B to C is shorter than the distance from A to B. In many instances, the mouse motion will not be in a straight line, and a curved path is indicated from points C to D, with the graphs of FIG. 7 illustrating the varying output of the x-axis and y-axis strain gauge bridges, at 88, 89. With rapid sampling, the direction and distance of motion is recalculated with sufficient frequency to provide a close correlation in the control of the cursor dot to the actual mouse motion.

With reference to FIG. 8, a modified stylus assembly 110 according to the invention herein is illustrated. The stylus assembly 110 includes a mounting block 112 which is mounted to the bottom plate 22 of the mouse housing 20 (otherwise not shown) and a stylus 115 mounted vertically in a center cavity 113 of the mounting block 112. The stylus 115 is characterized by having a tip end 120 in the form of a pad, which engages the work surface 12. The pad 120 provides a greater area of contact between the stylus tip and the work surface 15, and the pad can be fabricated of a material selected for a desired co-efficient of friction, between it and the work surface, so as to obtain desired bending and vibration of the stylus. Other tip shapes are useful.

With reference to FIGS. 9 and 10, another alternative stylus assembly 130 for mouse 10, according to the invention herein, is illustrated. The stylus assembly 130 consists of a cylindrical mounting block 132 extending upwardly from the bottom plate 22 of the mouse housing, the mounting block having a central opening 133 aligned with opening 25 in the bottom plate. A diaphragm 135 is positioned across the top of the mounting block 132 and a stylus 140 has its upper end 141 mounted to the central portion of the diaphragm, and extends downwardly through opening 25, with stylus tip 142 in contact with work surface 15. Four strain gauges 136–139 are mounted to the diaphragm, deployed 90° apart as best illustrated in FIG. 10. With particular reference to FIG. 9, movement of the mouse across the work surface causes the stylus 140 to bend from its rest position, and the bend of the stylus stresses and distorts the diaphragm 135, also as illustrated. As noted above, the term "bending" includes this stylus action, in that the entire stylus is displaced, even though the stylus itself is not bowed or curved. A portion of the diaphragm under strain gauge 139 is bowed upwardly, thereby elongating strain gauge 139, and the portion of the diaphragm under strain gauge 137 is bowed downwardly, compressing strain gauge 137. It will be appreciated that the strain gauges 136–139 may be connected into strain gauge bridges and circuitry as described above, or similar circuitry, for detecting both of the direction of bending and vibration of the stylus 140, in order to provide cursor dot control signals indicative of the direction and distance of mouse motion on the work surface.

In FIGS. 11 and 12, yet another stylus assembly 150 for use in a mouse according to the invention herein is illustrated. The stylus assembly 150 operates on photoelectric principles. More particularly, the stylus assembly 150 includes a mounting block 132 secured to the bottom plate 22 at the mouse housing and supporting a diaphragm 135, and a stylus 140 having its upper end secured to the central portion of the diaphragm and its tip 142 contacted with the work surface 15, all like to the stylus assembly 130 described above. With reference to FIG. 11, a mirror 155 is secured to the upper surface of the diaphragm 135, centered on the axis of the stylus 140. A photoelectric quad cell 160 is mounted above the mirror 155, and has its light-receiving surface facing the mirror 155. The photoelectric quad cell 160 is divided into four quadrants, each of which independently produces a signal upon receipt of light input, the quadrants being numbered 161, 162, 163 and 164 in FIG. 12. With reference again to FIG. 11, a light source 152 and lens 153 provide a beam of light to a half-silvered reflector 154, the half-silvered reflector being positioned between the mirror 155 and the photoelectric quad cell 160. A beam 156 from light source 152 and lens 153 is thereby reflected on to the mirror 155 and from the mirror 155 the beam is passed through the half-silvered reflector 154 to impinge on the photoelectric quad cell 160. It will be appreciated that the bend of stylus 140 due to interaction with the work surface 15 as the mouse is moved thereover stresses the diaphragm 135 and inclines the mirror 155, whereby the beam of light impinging upon the photoelectric quad cell 160 is moved off center. This is illustrated by the dot 157 shown in solid in FIG. 12. The output of the photoelectric quad cell can then be utilized to determine the direction of motion of the mouse. For example, the component of motion in the x-axis would be proportional to the sum of the signals from quadrants 161 and 163 minus the sum of the signals from quadrants 162 and 164; and the component motion in the y-axis would be proportional to the sum of the signals from quadrants 161 and 162 minus the signals from the quadrants 163 and 164. In addtion to bending, the stylus and the diaphragm and mirror mounted with the stylus vibrate as the mouse is moved across the work surface, whereby the beam impinging upon the photoelectric quad cell dithers about a mean position. This is illustrated schematically in FIG. 12 by the dotted beam impact area 158. The short term changes in the outputs of the quadrants can be utilized to determine the frequency of the dithering which is proportional to speed and thereby indicative of distance moved.

Accordingly, the mouse described above admirably achieves the objects of the invention herein. It will be appreciated that the embodiments described can be altered without departing from the spirit and scope of the invention. For instance, other mounting structures could be provided for the stylus, and transducers other than strain gauges or photcells could be used to detect bending and vibration of the stylus. Also, the uses of the mouse output are not limited to controlling a cursor dot. Thus, the invention is limited only by the following claims.

We claim:

1. A mouse for producing signals indicative of its motion on a surface, comprising:
(A) a housing adapted for sliding movement on the surface;
(B) a stylus assembly mounted to said housing, including a stylus extending toward a surface and having a tip in contact with the surface, said stylus bending and vibrating during movement of the housing on the surface;

(C) transducer means sensing bending and vibration of the stylus during movement of the housing on the surface; and (D) calculating means for deriving signals indicative of the direction and distance of movement of the housing on the surface, based on the sensed bending and vibration of the stylus during movement of the housing on the surface.

2. A mouse as defined in claim 1 wherein the upper end of the stylus is rigidly mounted to the housing, the lower tip end of the stylus is in contact with the surface, and the stylus is fabricated of resilient spring material which bends and vibrates as the housing is moved on the surface.

3. A mouse as defined in claim 2 wherein the housing includes a bottom plate having an opening therein, the bottom plate being supported by depending legs for sliding movement on the surface, and the stylus assembly includes a mounting block secured to the bottom plate of the housing, the mounting block having an opening therein aligned with the opening in the bottom plate, and the stylus is mounted to the mounting block, and extends through the opening therein and the opening in the bottom plate into contact with the surface.

4. A mouse as defined in claim 3 wherein the stylus tapers to a point at its lower tip end.

5. A mouse as defined in claim 3 wherein the lower tip end of the stylus is a pad in contact with the surface.

6. A mouse as defined in claim 2 wherein the transducer means are plural strain gauges mounted to the stylus intermediate its length.

7. A mouse as defined in claim 6 wherein the plural strain gauges comprise four strain gauges evenly spaced about the circumference of the stylus.

8. A mouse as defined in claim 7 wherein the housing has an elongated shape defining a y-axis of an x-y coordinate system, and one pair of the strain gauges are aligned in the y-axis and one pair of the strain gauges are aligned in the x-axis.

9. A mouse as defined in claim 7 wherein the housing mounts buttons for user/software interactive communication, and said buttons are mounted on the positive y-axis end of the housing.

10. A mouse as defined in claim 7 wherein the opposed pairs of strain gauges are respectively connected into x-axis and y-axis strain gauge resistance bridges.

11. A mouse as defined in claim 10 wherein the calculating means includes the strain gauge resistance bridges, circuitry for operating the strain gauge resistance bridges and conditioning the signals derived therefrom, and microprocessor means programmed to determine the direction and distance of mouse motion in accordance with the signals from the strain gauge resistance bridges.

12. A mouse as defined in claim 11 wherein the circuitry and microprocessor are mounted within the housing of the mouse.

13. A mouse as defined in claim 3 wherein the legs supporting the housing above the surface are height adjustable to vary the engagement between the stylus and surface.

14. A mouse as defined in claim 1 wherein the transducer means are plural strain gauges mounted to the stylus intermediate its length.

15. A mouse as defined in claim 1 wherein the upper end of the stylus is mounted to a flexible diaphragm wherein bending and vibration of the stylus during motion of the housing across the surface are imparted to the diaphragm, and the transducers sense the bending and vibration from the diaphragm.

16. A mouse as defined in claim 15 wherein the housing includes a bottom plate having an opening therein, the bottom plate supported for sliding movement on the surface by depending legs, and the stylus assembly includes a mounting block secured to the bottom plate and surrounding the opening therethrough, wherein the diaphragm is mounted to the upper end of the mounting block and the stylus extends downwardly therefrom through the opening in the bottom plate and into contact with the surface.

17. A mouse as defined in claim 15 wherein the upper end of the stylus is mounted centrally on said diaphragm.

18. A mouse as defined in claim 17 wherein the transducer means are a plurality of strain gauges mounted on the diaphragm.

19. A mouse as defined in claim 18 wherein the plurality of strain gauges comprise four strain gauges deployed at 90° spacing the centrally mounted stylus.

20. A mouse as defined in claim 19 wherein the housing has an elongated shape defining a y-axis of an x-y coordinate system, and one pair of the strain gauges are aligned in the y-axis and one pair of the strain guages are aligned in the x-axis.

21. A mouse as defihed in claim 1 wherein said transducer means comprise photocell means receiving a light beam which is directed onto the photocell and dithered thereon by bending and vibration of the stylus during movement of the housing on the surface.

22. A mouse as defined in claim 21 wherein a mirror is mounted with said stylus for directing the light beam onto the photocell means.

23. A mouse as defined in claim 22 wherein the upper end of the stylus is mounted to a flexible diaphragm, the flexible diaphragm mounts the mirror, the photocell means are mounted above and facing the diaphragm, and a light source provides a beam of light which is directed to said mirror and reflected onto the photocell means.

24. A mouse as defined in claim 23 wherein the photocell means comprises a photoelectric quad cell wherein motion and vibration are derived from the independent outputs of the quadrants of the photoelectric quad cell.

25. A method of deriving control signals for a cursor dot on a computer controlled cathode ray tube display, comprising:

(A) providing a housing for sliding movement on a work surface and a stylus depending from said housing having a tip in contact with the surface, said housing establishing a two-dimensional coordinate system correlating to the two-dimensional display on the cathode ray tube;

(B) orienting and moving the mouse in the desired direction of cursor dot movement, thereby bending and vibrating the stylus during mouse movement by means of stylus-surface interaction;

(C) during movement of the housing on the surface ascertaining the direction of bending of the stylus within the coordinate system defined by the housing and ascertaining the vibration of the stylus; and (D) calculating the direction and distance of mouse motion on the work surface from the bending and vibration of the stylus and providing the calculated direction and distance of motion for use in controlling the motion of a cursor dot on a computer controlled cathode ray display.

* * * * *